United States Patent [19]

Wu

[11] 4,206,437
[45] Jun. 3, 1980

[54] TRANSDUCER WITH COMPENSATION FEATURES

[75] Inventor: Charles T. Wu, Troy, Mich.
[73] Assignee: The Bendix Corporation, Southfield, Mich.
[21] Appl. No.: 947,317
[22] Filed: Oct. 2, 1978
[51] Int. Cl.² ........................................... H01L 10/10
[52] U.S. Cl. ..................................... 338/36; 73/708; 338/8
[58] Field of Search .................. 338/36, 41, 7, 8, 135, 338/3; 73/708

[56] References Cited

U.S. PATENT DOCUMENTS

| | | | |
|---|---|---|---|
| 2,243,807 | 5/1941 | Malone | 338/42 |
| 2,486,742 | 11/1949 | Gebhardt | 73/708 |
| 2,841,674 | 7/1958 | Bourns et al. | 338/41 |
| 2,857,495 | 10/1958 | Bourns et al. | 338/41 |
| 2,984,803 | 5/1961 | Bourns et al. | 338/41 |
| 3,172,292 | 3/1965 | Graham et al. | 73/708 |
| 3,173,120 | 3/1965 | Marks et al. | 338/41 X |
| 3,545,274 | 12/1970 | Derr et al. | 73/708 |

Primary Examiner—C. L. Albritton
Attorney, Agent, or Firm—John R. Benefiel; Russel C. Wells

[57] ABSTRACT

A movable member pressure transducer is disclosed which incorporates various thermal and manufacturing tolerance compensation features. These include a temperature compensating bimetal interposed between the movable member and the pressure sensing aneroid; a threaded engagement between a potentiometer wiper contact and a movable member used to generate an electrical signal corresponding to the position of a lower member, with the threaded engagement allowing adjustment of the zero position of the wiper contact with respect to the potentiometer resistive element; a cantilevered spring is mounted in contact with the free end of the movable member. The cantilever spring mounted in a holder is constructed of a material selected to have a coefficient of thermal expansion compensating for variations in sensitivity due to temperature changes by corresponding changes in the effective lever arm of the cantilever spring by shifting the point of contact of the end of the movable member with the cantilever spring. The holder is also adjustable in position to enable calibrating adjustments to be made of the sensitivity of the aneroid. The cantilever spring may also be constructed of a bimetal to provide an additional temperature zero setting compensation. A nonlinear spacing of the resistive elements of the potentiometer is employed to linearize the output signal.

9 Claims, 3 Drawing Figures

TRANSDUCER WITH COMPENSATION FEATURES

BACKGROUND DISCUSSION

In many transducers, a member is caused to be moved in correspondence with a measured parameter (measurand). The relative position of the movable member is sensed, as by the use of a linear motion potentiometer to thereby generate an electrical signal corresponding to the relative position of the movable member, which thus in turn corresponds to the measured parameter. This dependence on the sensing of the relative position of the movable member may create error in the zero position due to the difference in the coefficient of thermal expansion of the various materials employed including the support housing, the movable member and in a transducer driver element, such as an aneroid, which causes the movable member to undergo its displacement.

In addition, the manufacturing tolerances may not insure the initial positioning of the movable member in the zero or null position. This is a problem particularly in potentiometer designs in which a wiper contact is positioned in a neutral position with respect to the resistive element.

In the case of a pressure transducer having an aneroid, bellows, or diaphragm element which is drivingly connected to the movable member causing its relative position to change in correspondence with pressure change, there are further problems in producing an accurate output signal. Some of these problems relate to the thermal characteristics of the aneroid in that the incremental movements produced by incremental changes in pressure may vary with temperature changes undergone by the unit.

It is desirable for most applications that the electrical output signal should bear a linear relationship with respect to the pressure changes in the interest of greater accuracy and simpler processing of the pressure signal in the control systems within which such pressure signal is utilized.

In automotive fuel control systems, such pressure sensor signals are currently being proposed to sense engine intake manifold pressure so as to achieve efficient fuel management. In this context, many of these problems are encountered due to the widely varying ambient temperature conditions and the relatively impreciseness of the tolerances to which such devices are manufactured. Furthermore, in such environments, such devices have to be highly reliable and very desirable to operate with little or no maintenance for long periods of time.

Accordingly, it is an object of the present invention to provide a combination of compensation features for a transducer of the type in which a movable output member is positioned in correspondence with a sensed parameter.

It is a further object of the present invention to provide such compensation features which substantially correct errors due to temperature variations experienced by the unit.

It is a further object of the present invention to provide for compensation of the zero position of the movable member to compensate for the effects of manufacturing tolerances built up in the components.

It is yet another object of the present invention to provide a compensation feature specifically for a pressure transducer in which the movement of the input member in correspondence with the sensed parameter has a tendency to vary with temperature conditions.

It is another object of the present invention to provide a transducer compensation which linearizes the electrical output signal generated in correspondence to the nonlinear displacement of a movable member.

It is another object of the present invention to provide a pressure transducer incorporating an aneroid, bellows, or diaphragm element variably positioning a movable output member which incorporates the compensation features described.

SUMMARY OF THE INVENTION

These and other objects of the present invention, which will become apparent upon a reading of the following specification and claims, are achieved by provision of a cantilever spring engaging one end of a movable member with the opposite end of the movable member driven by the transducer driver element imposing a force on the movable member in correspondence with a measured parameter such as pressure. The cantilever spring is mounted on a holder which is adjustable in position to enable sensitivity calibration adjustments for the transducer. In addition, the holder is constructed of a material which varies in length with temperature in such a manner as to vary the effective moment arm of the cantilever spring in acting on the end of the movable member to thereby produce a compensation for shifts in sensitivity due to temperature variations. The cantilever spring may be constructed of a bimetal element to tend to correct zero shifts which occur with temperature variations. The movable member may drive a sliding contact of a linear motion potentiometer to produce electrical signals in correspondence to the relative position of the movable member and, in this version, incorporates an adjustable position wiper contact threadably engaging the movable member. Its position thereon thus is adjustable by rotation of the movable member to adjust the zero or null position of a slider contact. This compensates for the effects of manufacturing tolerances in the manufacture of the transducer.

In addition to these features, an additional thermal zero shift compensation arrangement may be incorporated, comprised of a bimetal U-shaped element interposed between the aneroid or other transducer driving element and the movable member. This element produces a corresponding relative movement between transducer driver member and the movable member in correspondence with temperature to offset changes in position of the movable member occurring as the offset movements of the transducer drive in correspondence with temperature to maintain the zero position of the movable member as it undergoes temperature variations.

Nonlinearity of the relationship of the displacement of the movable member and the parameter measured may be offset by a nonlinear output potentiometer such that a linear relationship between the electrical output signals and the parameter measured is achieved.

DETAILED DESCRIPTION

Figure 1:
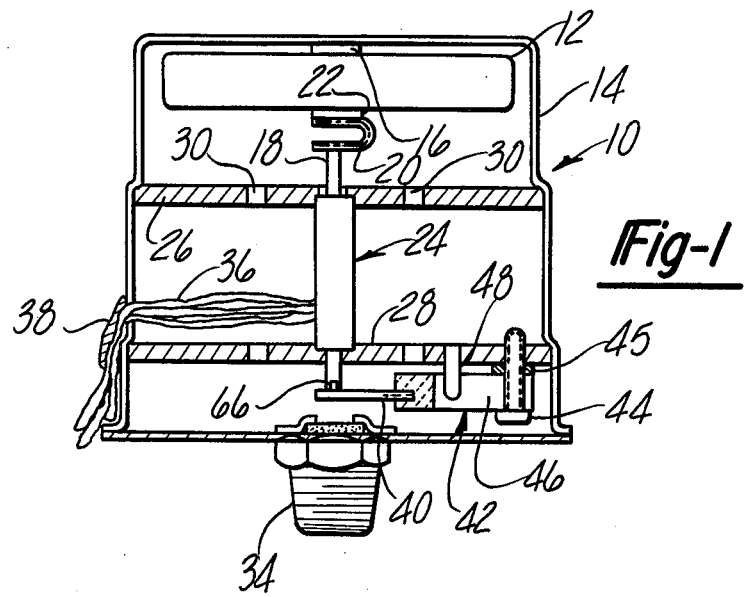
FIG. 1 is a view in partial longitudinal section of the pressure transducer incorporating the compensation features of the present invention.

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, the compensating features according to the present invention will be specifically described in conjunction with a pressure transducer 10. The pressure transducer 10 includes a pressure sensing driver element which may consist of an aneroid 12 mounted within the transducer housing 14. The aneroid 12 consists of a sealed enclosure which expands and contracts with changing pressure conditions exerted on the exterior of the aneroid 12 in a manner well known in the art.

One side of the aneroid 12 is secured to the transducer housing 14 by means of a disc 16. The opposite side of the aneroid 12 provides the output force or movement which varies in correspondence with the variations in external pressure. Its output movement is transmitted to an elongated rod comprising a movable member 18 via a U-shaped bimetal 20 connected to a disc 22 joined to the opposite end of the aneroid 12. The expansion and contraction of the aneroid 12 thereby produces corresponding relative displacement of movable member 18 with respect to the transducer housing 14. The aneroid 12 thus constitutes a transducer driver element to produce an output movement in correspondence with the sensed parameter, i.e., pressure, with this output movement being transmitted into the movable member 18 via disc 22 and the U-shaped bimetal 20.

The relative displacement of the movable member 18 relative the transducer housing 14 is sensed by means of a potentiometer or slide wire variable resistance 24 mounted within transducer housing 14 between a pair of holder plates 26 and 28 press fitted into the interior of the transducer housing 14. The potentiometer 24 is received within counterbores formed within the central region of each of the holder plates 26 and 28. Vent holes 30 and 32 are formed in each of the holder plates 26 and 28 to insure that pressure to be measured introduced in the interior of the transducer housing 14 via fitting 34 is communicated to the aneroid 12. A filter 35 may be employed to prevent the entrance of dust or other contaminants.

Thus, as movable member 18 is displaced by the aneroid 12 expansion and contraction, this movement may be sensed by the relatively fixed potentiometer 24.

The electrical leads 36 extend through the housing through fitting 38 and to the external control circuitry utilizing the corresponding electrical signal generated in the potentiometer 24 by the relative movement of the movable member 18.

The opposite end of the movable member 18 is restrained by engagement with the upper surface of a cantilever spring 40. The cantilever spring 40 is in turn supported by a holder 42 secured to the holder plate 28 by a threaded fastener 44 passing through a spacer 45 and a slot 46 in the holder. A dowel pin 48 carried by the holder plate 28 extends into the slot 46 and maintains the position of the holder 42 and the cantilever spring 40 so as to insure proper engagement of the free end of movable member 18 in engagement therewith.

Figure 2:
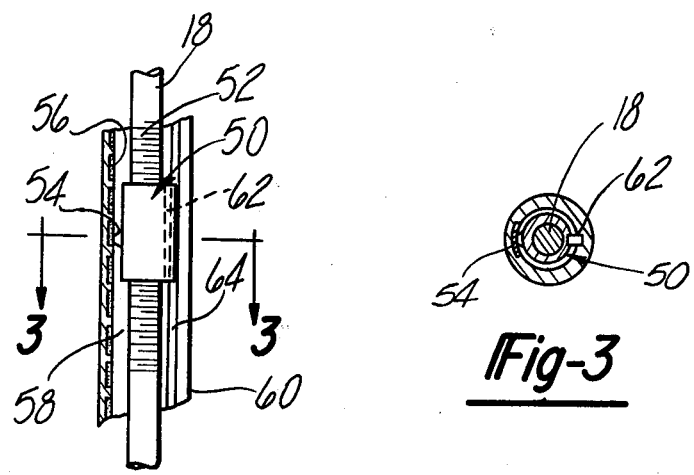
FIG. 2 is an enlarged partially sectional view of the portion of the pressure transducer depicted in FIG. 1.
Figure 3:
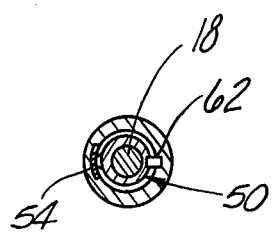
FIG. 3 is a view of section 3—3 taken in FIG. 2.

Referring to FIGS. 2 and 3, the movable member 18 is provided with a slider contact member 50 which rather than being affixed to the movable member 18 is threadably mounted thereon along the length of an external thread 52 machined intermediate the length of the movable member 18. Slider contact member 50 is formed with an internal thread mating therewith and includes a slider contact 54 which engages resistive element or slide wire windings 56 extending along the interior of a bore with the movable member 18 passing through the bore 58. The movements of the movable member 18 produce a change in position of the slider contact 54 with respect to the resistive element or windings 56 which produce an electrical output signal via the leads 36 in correspondence with the relative movement.

Slider contact member 50 is restrained against rotation in bore 58 by a key 62 moving in a slot 64 formed in the potentiometer housing 60 in order to provide a means for changing the relative position of the slider contact member 50 and movable member 18. A screwdriver slot 66 is provided in the free end of movable member 18 such that upon rotation thereof, the slider contact member 50 is restrained by the key 62.

Depending upon the direction of rotation of movable member 18, the slider contact 54 is advanced in either direction on the threaded intermediate section of movable member 18. This has the effect of changing the null or zero position of the movable member 18 with respect to the potentiometer resistive element or windings 56 such that the electrical signal may be zeroed after assembly thereof to compensate for variations in tolerances of the various components.

The U-shaped bimetal 20 and cantilever spring 40 and holder 42 comprise compensation means for the various factors noted above. The U-shaped bimetal 20 is designed to expand or contract in correspondence with temperature variations. The specific sizing, particular metals used, etc., of the U-shaped bimetal 20 are selected to produce a corresponding offset to the net differential in temperature induced expansion and contraction occurring in the various components, including the movable member 18, the transducer housing 14, etc. Changes in relative position of the movable member 18 which could occur as the assembly undergoes temperature variations are thus effectively nulled. The offsetting changes in position of the movable member 18 are caused by the thermally induced movements of the U-shaped bimetal 20.

It is noted that this feature has heretofore been utilized in other contexts and does not per se constitute the present invention.

The cantilever spring 40 serves to oppose the movements of the movable member 18 induced by the expansion and contraction of the aneroid 12. This force generated by deflection of the cantilever spring 40 counters the force generated by the aneroid 12. By making the spring force adjustable via the slot 46 and threaded fastener 44, the sensitivity of the aneroid 12 may be adjusted or calibrated during initial set up of the pressure transducer 10. That is, the variations in manufacture may result in a variation of the output movement of the aneroid 12 for given changes in pressure.

In order to standardize the instrument sensitivity and calibrate the transducer sensitivity, the change in position of the holder 42 may provide an adjustability in the bending arm of the cantilever spring 40, such as to vary the sensitivity of the aneroid 12. This allows initial calibration thereof by affording adjustability in the counter force applied to the free end of the movable member 18.

The holder 42 is designed to have a differing coefficient of thermal expansion than the cantilever spring 40 itself, in a direction tending to counter the changes in sensitivity in the aneroid 12 with temperature. That is, if such sensitivity increases with increasing temperature, the material of which holder 42 is constructed is selected to be such as to expand at a greater rate with temperature changes than the cantilever spring 40 to effectively reduce the lever arm of the cantilever spring 40. This increases the stiffness thereof and applies a greater countering spring force to the movement of the movable member 18.

The cantilever spring 40 may be constructed of a bimetal element such as to increase and decrease the spring force with temperature variations to provide a zero offset compensation supplemental to the U-shaped bimetal 20.

It is also contemplated that the potentiometer resistive element or windings 56 be configured in a special nonlinear relationship between incremental corresponding movements of movable member 18 so that an offsetting nonlinearity function of resistive element or in the positioning of the potentiometer windings 56 can be provided such as to produce a net linear electrical output signal. This linear relationship had advantages in simplifying the signal processing circuitry associated for such applications as automotive fuel control systems. Although known in potentiometer designs employed in other contexts, this has special advantage in the combination described herein.

All of the various specifics of these components are to be selected on the basis of the actual details of the components employed, i.e., the specific characteristics of the aneroid, bellows, or diaphragm transducer drive element, the materials employed in the manufacturing processes, etc., in accordance with well known engineering principles.

It can be seen that a number of compensation features are incorporated in pressure transducer 10 which serve to achieve the above-recited objects, i.e., changes in the zero or null position with temperature, changes in the sensitivity of the transducer with temperature, initial calibration of the zero position and the instrument sensitivity, and compensation for a nonlinearity in the movement of the output of the forced transducer driver. While these compensation features should enable essentially complete compensation for these various factors, the compensation is achieved with the use of extremely simple components which can be incorporated at relatively low cost. These features should act in a highly reliable manner to achieve the end result of a pressure or other transducer which is highly accurate and reliable, and which does not exhibit the characteristics of a substantially varying output with changes in temperature.

It is noted that the features may be adaptable to other transducers than pressure transducers to which a driver element is caused to move in correspondence with a measured parameter and in turn causes movement of a relatively movable member.

The embodiments of the invention in which an exclusive property or privilege is claimed are defined as follows:

1. A transducer for generating a corresponding output signal from a sensed parameter, said transducer comprising:
   a transducer driver element producing an output movement in correspondence with changes in said sensed parameter;
   a movable member driven by said transducer driver element and the displacement of said movable member corresponding to said sensed parameter changes;
   means for generating an output signal in correspondence with said displacement of said movable member;
   means opposing said displacement of said movable member including a spring means engaging said movable member, and including means for varying the spring force exerted thereon as the temperature of said transducer changes, whereby changes in the sensitivity of said transducer driver element may be compensated for by said changes in said opposing force applied to said movable member.

2. The transducer according to claim 1 wherein said spring means comprises a cantilever spring engaging said movable output member and further including means shifting the point of engagement of said movable member with said cantilever spring with temperature variations to achieve a change in effective moment arm of said cantilever spring, whereby said spring force is thereby changed with temperature changes.

3. The transducer according to claim 2 further including a cantilever spring holder and means for adjustably mounting said holder to enable adjustable changes in the position of the point whereat said movable member engages said cantilever spring, whereby said spring force can be adjusted to enable changes in said sensitivity of said transducer.

4. The transducer according to claim 2 wherein said cantilever spring comprises a bimetal element whereby said spring force exerted on said movable member varies with temperature, whereby said sensitivity of transducer is varied with changes in temperature undergone by said transducer.

5. The transducer according to claim 1 wherein said movable member comprises an elongated member and further including a linear motion potentiometer comprising a slider contact coupled to said movable member and a resistance winding successively contacted by said slider contact during movement of said movable member, whereby said linear motion potentiometer comprises said means for generating signals in correspondence with said displacement of said movable member.

6. The transducer according to claim 5 wherein said slider contact comprises a slider contact member threadably engaged with said elongated member, whereby said relative position of said slider contact with respect to said elongated member may be adjusted to thereby vary the zero position of said movable member with respect to said resistance of said linear motion potentiometer.

7. The transducer according to claim 1 wherein said transducer driver comprises a pressure sensitive sealed enclosure and means driving said movable member by expansion and contraction of said enclosure.

8. The transducer according to claim 7 wherein said means driving said movable member by said sealed pressure enclosure comprises a U-shaped bimetal member joined at one end to said sealed enclosure and the other end to said movable member, whereby the relative position of said movable member and said sealed enclosure varies with temperature by movement of said U-shaped bimetal member ends together or apart as said transducer undergoes temperature variations, whereby the effects of said temperature variations on said relative position of said enclosure, said movable member and said means for generating an output signal in correspondence with said displacement of said movable member may be nullified.

9. The transducer according to claim 5 wherein said movable member is moved in a nonlinear relationship with changes in said sensed parameter and wherein the changes in resistance of said linear motion potentiometer vary with movement of said movable member in an offsetting nonlinear function, whereby a linear output signal is provided.

* * * * *